US012178362B2

(12) United States Patent
Varjabedian et al.

(10) Patent No.: US 12,178,362 B2
(45) Date of Patent: Dec. 31, 2024

(54) COOKWARE WITH UTENSIL REST

(71) Applicant: SharkNinja Operating LLC, Needham, MA (US)

(72) Inventors: Nicholas Varjabedian, Taunton, MA (US); Eric Arthur Miller, Jr., Somerville, MA (US)

(73) Assignee: SharkNinja Operating LLC, Needham, MA (US)

(*) Notice: Subject to any disclaimer, the term of this patent is extended or adjusted under 35 U.S.C. 154(b) by 163 days.

(21) Appl. No.: 17/709,119

(22) Filed: Mar. 30, 2022

(65) Prior Publication Data
US 2023/0309753 A1 Oct. 5, 2023

(51) Int. Cl.
A47J 43/28 (2006.01)
A47G 21/04 (2006.01)

(52) U.S. Cl.
CPC ............ A47J 43/287 (2013.01); A47G 21/04 (2013.01)

(58) Field of Classification Search
CPC ................................ A47J 43/287; A47G 21/04
See application file for complete search history.

(56) References Cited

U.S. PATENT DOCUMENTS

| 5,105,963 | A | * | 4/1992 | Scott | A47J 43/287 220/756 |
| 5,829,342 | A | * | 11/1998 | Lee | A47J 36/06 366/279 |
| 5,924,592 | A | * | 7/1999 | Hieronymus | A47J 43/287 220/756 |
| D528,353 | S | * | 9/2006 | Brady | D7/360 |
| 7,485,831 | B2 | * | 2/2009 | Tynes | A47J 27/004 220/780 |
| D746,099 | S | * | 12/2015 | Pallotto | D7/354 |
| D754,472 | S | * | 4/2016 | Munari | D7/393 |
| 9,474,410 | B2 | * | 10/2016 | Hudgins | A47J 36/10 |
| D887,777 | S | * | 6/2020 | Beall | D7/394 |
| 2007/0210094 | A1 | * | 9/2007 | Kutsch | A47J 45/06 220/735 |

(Continued)

FOREIGN PATENT DOCUMENTS

KR 102163800 B1 * 10/2020

OTHER PUBLICATIONS

Sertodo copper sauce pan with patented stainless steel handles, 2.5 quart capacity sold on amazon.com dated Oct. 19, 2020, https://www.amazon.com/Sertodo-capacity-Hammered-Patented-Stainless/dp/B08LDTYV35 (Year: 2020).*

(Continued)

Primary Examiner — Terrell L McKinnon
Assistant Examiner — Ding Y Tan
(74) Attorney, Agent, or Firm — Mintz, Levin, Cohn, Ferris, Glovsky and Popeo, P.C.

(57) ABSTRACT

Cooking assemblies, cooking containers, lids, racks, and utensils are provided. In one embodiment, a handle is provided for use on a cooking assembly and is configured to interact with a utensil for supporting the utensil on the lid. In certain embodiments, the handle can have an aperture that is sized to receive a complementary support on a cooking utensil. Through this aperture and support, the utensil can be retained on the lid when not in use, and the support can further act as a support to elevate a utensil head and prevent excess mess.

19 Claims, 6 Drawing Sheets

(56) References Cited

U.S. PATENT DOCUMENTS

| | | | | |
|---|---|---|---|---|
| 2007/0289981 | A1* | 12/2007 | Shaw | A47J 43/288 220/735 |
| 2010/0251902 | A1* | 10/2010 | Schandel | A47J 36/10 99/348 |
| 2013/0037553 | A1* | 2/2013 | Bourbeau | A47J 45/061 220/573.1 |
| 2013/0133206 | A1* | 5/2013 | Donovan | A47G 21/02 30/340 |
| 2014/0116260 | A1* | 5/2014 | Hudgins | A47J 36/10 99/324 |
| 2014/0197186 | A1* | 7/2014 | Smith | A47J 36/00 220/735 |
| 2016/0015208 | A1* | 1/2016 | Pallotto | B65D 25/28 220/573.1 |
| 2016/0066743 | A1* | 3/2016 | Prommel | A47J 43/287 220/573.1 |
| 2016/0255994 | A1* | 9/2016 | Walker | A47J 36/025 |
| 2018/0042416 | A1* | 2/2018 | Kopke | A47G 21/04 |
| 2019/0298090 | A1* | 10/2019 | Stevenson | A47G 21/02 |
| 2019/0335931 | A1* | 11/2019 | Ribi | A47G 21/02 |
| 2021/0015291 | A1* | 1/2021 | Tehrani | A47J 45/061 |
| 2022/0322886 | A1* | 10/2022 | Olsen | A47G 21/145 |

OTHER PUBLICATIONS

Taku Ironware duo camping set cookware facebook photo postings dated Aug. 23, 2016 (https://www.facebook.com/takuironware/photos) and Taku ironware duo camping set SKU: 20900012601 online webpage, https://www.takuironwareusa.com/product-page/duo-camping-dutch-oven-%E9%9C%B2%E7%87%9F%E9%8D%8B (Year: 2016).*

* cited by examiner

COOKWARE WITH UTENSIL REST

FIELD

A cookware assembly is provided having a handle with a utensil rest for holding a utensil.

BACKGROUND

Various cookware, such as pots, pan, lids, and utensils, are used to prepare food products. When a utensil, such as a ladle is used, for example, to stir food contained in a cooking container, the ladle end will often remain coated in the food. Any placement of the coated ladle onto a countertop, for example, with thus transfer the food onto the surface of the countertop. Accordingly, there is a need for devices and methods for holding a utensil during cooking.

SUMMARY

A handle is provided for use on a lid of cookware. The handle has a configuration that allows a utensil to rest thereon.

In one embodiment, a cooking assembly is provided. The cooking assembly can include a container defining an inner chamber. The container can have an upper rim defining an opening to the inner chamber. The cooking assembly can also include a lid having a circumferential lip configured to removably contact the upper rim of the container, and a lid handle coupled to a central portion of the lid. The lid handle can include a horizontally planar upper surface defining an opening therethrough. The cooking assembly can further include a utensil having a head portion and a utensil handle portion. The utensil handle portion can have a protrusion extending from a side thereof. The utensil can be configured to rest on the horizontally planar surface with the protrusion extending through the opening.

In one embodiment, the container can include at least one container handle coupled to an outer surface thereof. For example, in one embodiment the container can be in the form of a pot having two container handles coupled to opposed sides thereof. In another embodiment, the container can be in the form of a pan having a single container handle coupled to a side thereof.

The lid handle can have a variety of configurations. In one embodiment, the lid handle can be substantially U-shaped with first and second legs extending therefrom. In certain embodiments, the legs can diverge relative to one another in a direction away from a central portion of the handle having the horizontally planar upper surface thereon.

In another embodiment, a cooking container is provided and includes a container defining an inner chamber. The container defines an upper rim defining an opening to the inner chamber, and the container can have at least one handle coupled to an outer surface thereof. The cooking container can also include a lid having a circumferential lip configured to removably contact the upper rim, and a handle coupled to a central portion of the lid. The lid can have a horizontally upper surface defining an opening therethrough.

The opening in the lid handle can have a variety of configurations. For example, it can be substantially rectangular. The opening can be sized to receive a complementary protrusion of a cooking utensil. In another embodiment, the handle can include two divergent legs coupled to opposite ends of the horizontally planar upper surface.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, a lid handle that is configured to allow a cooking utensil to rest thereon is provided. The lid handle can be located on a lid of a cooking container, and thus can be provided as part of a cooking assembly. The cooking container can have various forms, and may include pots and pans. In one embodiment, the lid handle can have a generally horizontal planar surface and can include an aperture formed therein. A cooking utensil can be provided having a head portion and a handle portion, and the handle portion can have a protrusion on a side thereof. The handle aperture can be sized to receive the protrusion on the cooking utensil, thereby facilitating positioning of the cooking utensil on the lid handle. The cooking utensil protrusion can also function to allow the utensil head to remain elevated when the cooking utensil is placed upon a flat surface.

Figure 1A:
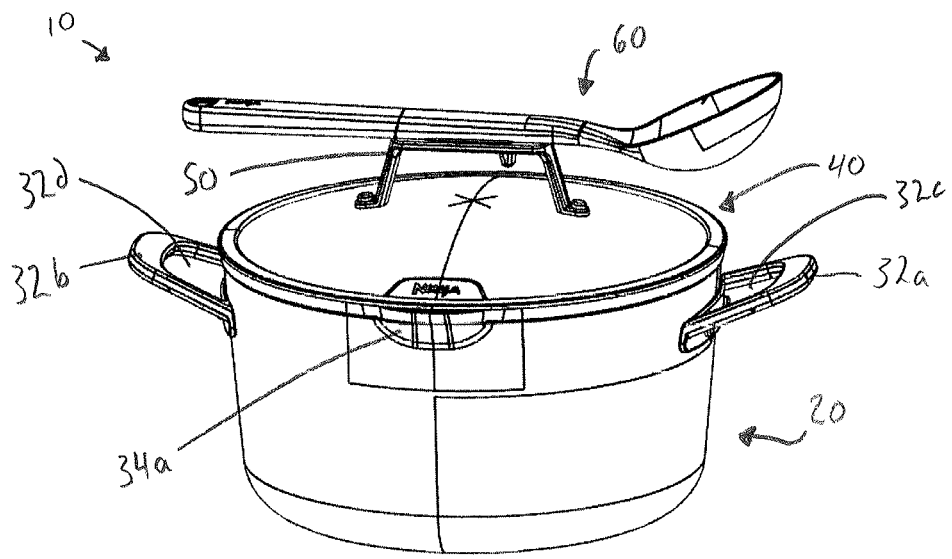
FIG. 1A is a front perspective view of one embodiment of a cooking assembly.

With reference now to FIGS. 1A-4B, an exemplary embodiment of a cooking assembly 10 is shown. The cooking assembly 10 includes a cooking container 20, a cooking lid 40 disposed atop the cooking container 20 and including a lid handle 50 affixed to an upper surface thereof, and a utensil 60 configured to rest on the lid handle 50 such that the utensil can be retained thereon. FIG. 1A depicts the utensil 60 mounted to the lid handle 50, while FIG. 1B depicts the utensil 60 unmounted from the lid handle 50. The cooking assembly and its components can be made from various materials, such as metals, plastics, rubbers, enamels, ceramics, glass, and other materials known in the art. Such materials will be compatible with cooking environments to provide sufficient heat transfer to food products cooked with the cooking assembly 10, as well as to protect a user during operation of the cooking assembly 10, such as, for example, insulating a handle to prevent burns.

Figure 2:
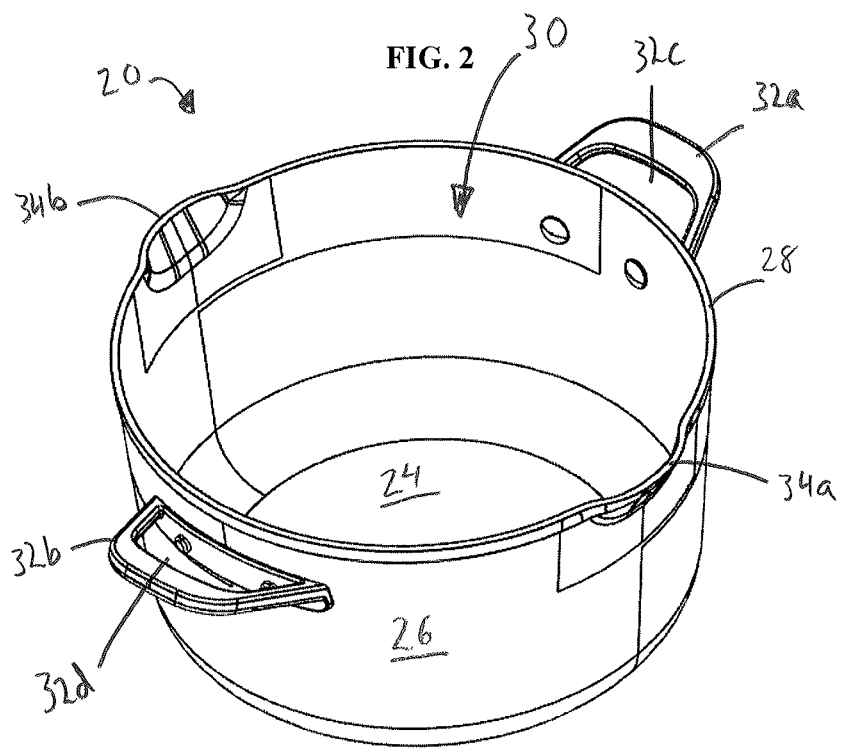
FIG. 2 is a front perspective view of a cooking container of the cooking assembly of FIG. 1A.

FIG. 2 shows the cooking container 20 with the lid 40 and utensil 60 removed. The illustrated cooking container 20 has a circular container base 24 with a cylindrical container side 26 extending upward from the container base 24. While not shown, the container base 24 on an underside thereof can include a conductive coating. The conductive coating can be a conductive material to allow for more efficient heat transfer to the cooking container 20, as well as to facilitate operation with induction heating systems. The container side 26 can extend to an upper extent, ending at a container rim 28. Together, the container base 24 and the container side 26 define a cooking chamber 30 therein. The region where the base 24 meets the container side 26 can be rounded both externally and internally within the cooking chamber 30. From a profile perspective, the container side 26 can expand radially outward from a bottom to a top thereof, such that a diameter of the container rim 28 is larger than a diameter of the container base 24. The cooking container 20 can also include first and second container handles 32a, 32b attached to opposite sides of the exterior of the container side 26, just below the container rim 28. Further, the container rim 28 can include one or more spouts, such as first and second spouts 34a, 34b, which are offset from the first and second handles 32a, 32b by approximate 90-degrees. The spouts can extend outward from the container rim 28 and can be configured to enable pouring of food contents contained within the cooking chamber 30.

Figure 3A:
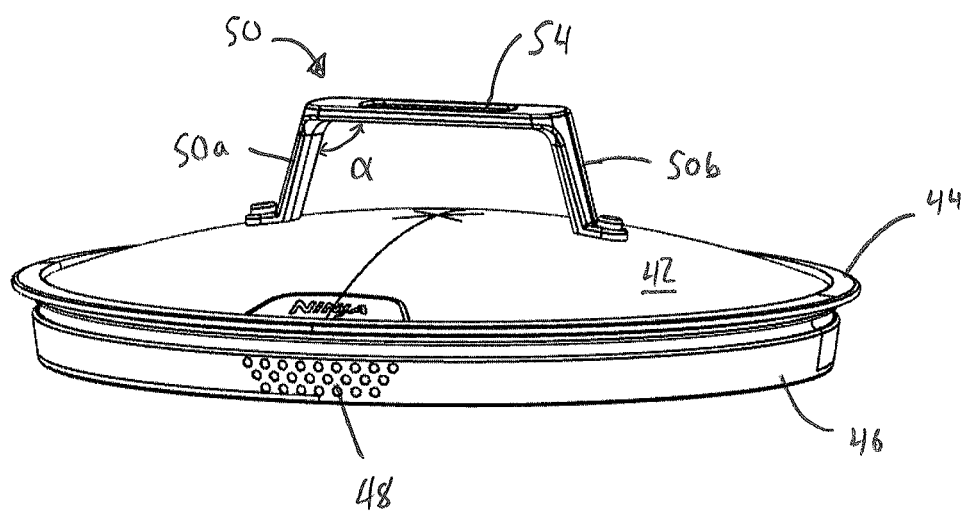
FIG. 3A is a front perspective view of a cooking lid of the cooking assembly of FIG. 1A.
Figure 3B:
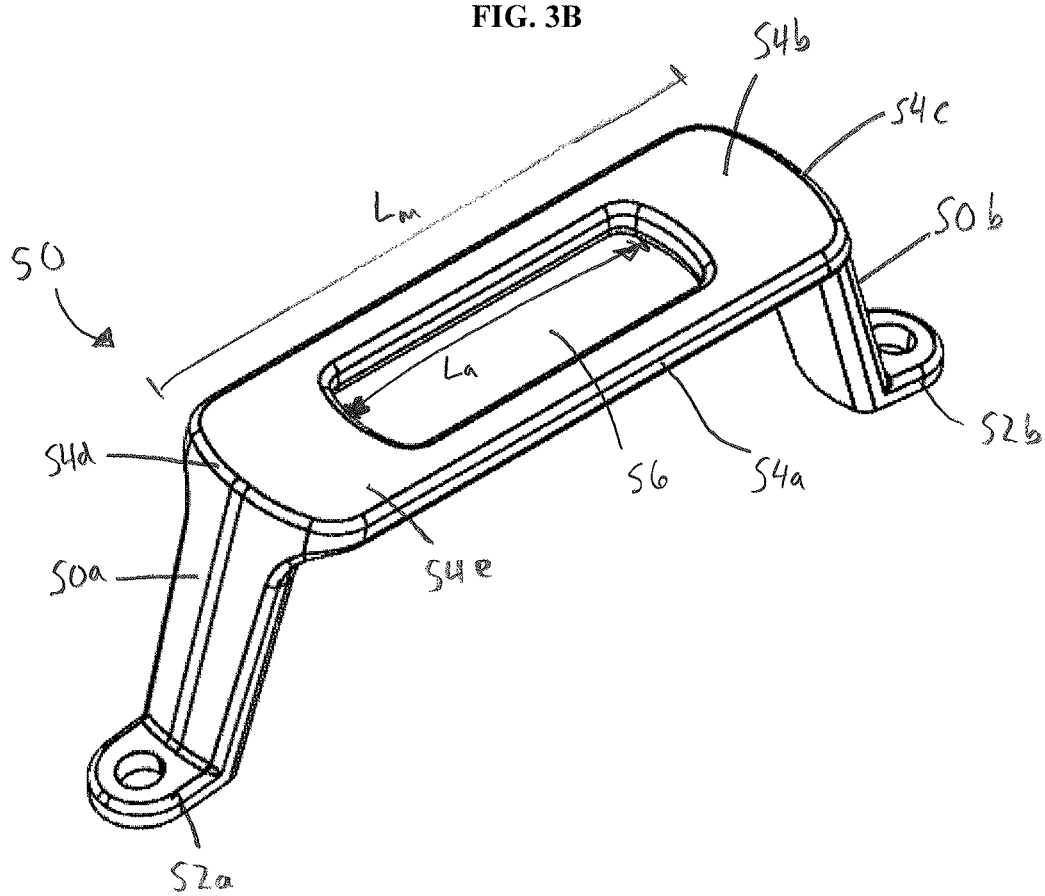
FIG. 3B is a front perspective view of a lid handle of the cooking lid of FIG. 3A.

FIGS. 3A and 3B show the cooking lid 40 with the lid handle 50 separate from the container 20. As shown, the illustrated cooking lid 40 includes a circular cooking lid base 42 sized to substantially correspond to the cooking container 20. The cooking lid base 42 can have a substantially convex shape upper surface and the lower or inner surface that faces the cooking chamber 30 can be substantially concave. The lid handle 50 can be mounted to the cooking lid base 42 at a central region thereof. The cooking lid base 42 can also include a cooking lid lip 44 extending radially outward from an outer edge of the cooking lid base 42, and it can include a lower ring 46 extending axially downward from the lower surface. In certain embodiments, the lower ring 46 can have a diameter that is less than a diameter of the cooking lid lip 44. The lower ring 46 can also include drainage apertures 48 disposed thereon.

In use, the cooking lid 40 is sized to cover the cooking chamber 30 at an upper extent thereof. When covering the cooking chamber 30, the lower ring 46 can be received within cooking chamber 30, radially inward from the cooking container rim 28, while the cooking lid lip 44 rests on top of the cooking container rim 28. In this covered configuration, the cooking lid 40 can be rotated so that the drainage apertures 48 align with either the first or second spout 34a, 34b. In some embodiments, the lower ring 46 can include more than one set of drainage apertures 48, such that the drainage apertures 48 can simultaneously align with the first and second spouts 34a, 34b.

FIG. 3B shows a front perspective view of the lid handle 50 which can be fixed to the rounded top surface 42a of the cooking lid 40, as discussed above. A person skilled in the art will appreciate that, while the lid handle 50 is shown and described in connection with the illustrated lid 40, the handle 50 can be used on any cooking lid having any configuration. In the illustrated embodiment, the lid handle 50 is substantially U-shaped with first and second legs 50a, 50b extending from a middle portion 54. Each of the first and second legs 50a, 50b can have a mounting foot 52a, 52b at lower region having a thru-hole configured to receive a fastener to mount the handle 50 to the rounded top surface 42a. Each of the first and second legs 50a, 50b can have various configurations. For example, the legs 50a, 50b can each have a width that tapers outward from a bottom extent to a top extent, flaring further to correspond to a width of the middle portion 54. With reference to FIG. 3A, the legs 50a, 50b can also extend at an angle α relative to the middle portion 54 that is greater than 90° such that the two legs 50a, 50b diverge away from one another from the top extend to the bottom extent. In other embodiments, the legs can extend at 90° relative to the middle portion. As further shown in FIG. 3B, the middle portion 54 can have a substantially elongate rectangular shape, having two longer sides 54a, 54b that are substantially linear, two shorter sides 54c, 54d that are curved, and planar upper and lower surfaces (only the upper surface 54e is shown). A substantially rectangular handle aperture 56 can be formed in a central region of the middle portion 54 and it can have a shape that corresponds to the shape of the middle portion 54. The length of the aperture 56 can vary, but in the illustrated embodiment the aperture 56 has a length La that extends along at least 50% of a length L. of the middle portion 54.

Figure 1B:
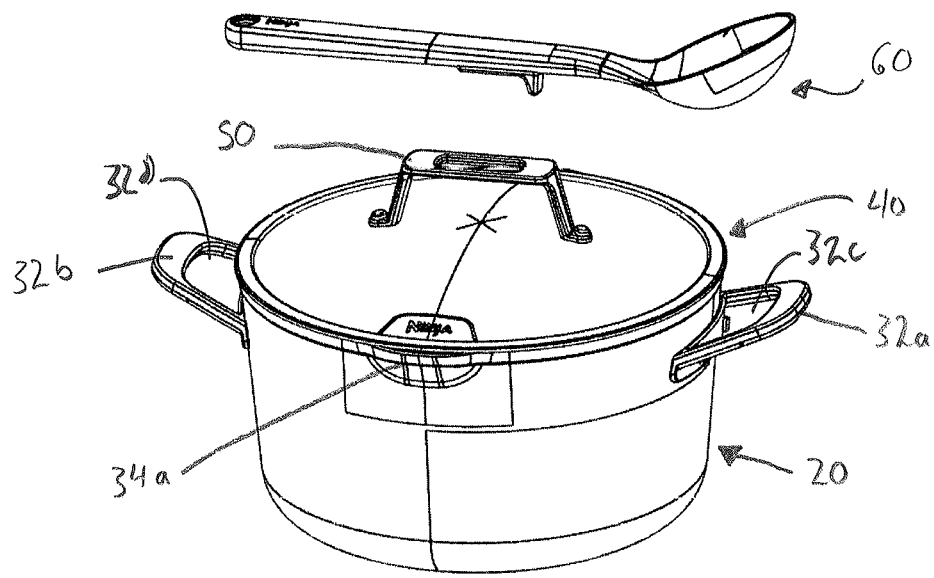
FIG. 1B is a front perspective view of the cooking assembly of FIG. 1A, having a utensil disengaged.
Figure 4A:
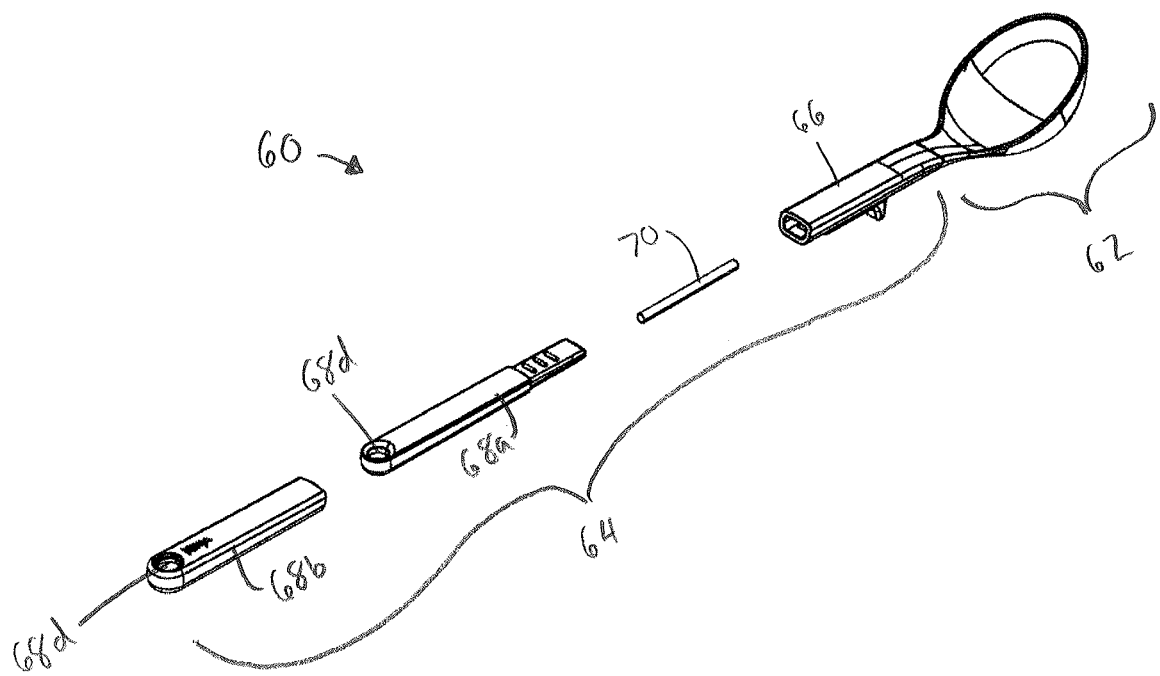
FIG. 4A is an exploded perspective view of a utensil of the cooking assembly of FIG. 1A.
Figure 4B:
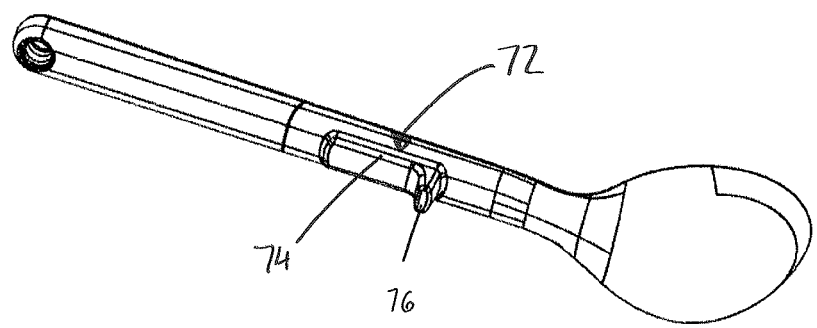
FIG. 4B is a rear perspective view of the utensil of FIG. 4A.

FIGS. 4A and 4B show the utensil 60 of FIGS. 1A and 1B in more detail. While the utensil is depicted as a spoon or ladle, any conceivable cooking utensil could be used in the cooking assembly 10, such as a spatula, a spork, a whisk, etc. The illustrated utensil 60 includes a head portion 62 and a handle portion 64 extending from the head portion 62. The handle portion 64 further includes an upper handle portion 66 directly fixed to or integrally formed with the head portion 62, and a lower handle portion 68 which can be removably attached to the upper handle portion 66 via a connector 70, which is shown in the form of a long cylindrical element. The illustrated lower handle portion 68 includes a lower handle body 68a and a lower handle cover 68b that can be slid over the lower handle body 68a when the utensil 60 is assembled during manufacturing. To aid in assembly, the lower handle body can have a ridged connection end 68*c* which can be received within a cavity in the upper handle portion 66 and retained therein. Both the lower handle body 68*a* and the lower handle cover 68*b* can have a handle aperture 68*d* therethrough which align when the utensil 60 is assembled. The handle aperture 68*d* can allow the utensil to be hung on a hook, or other similar structure.

Figure 4C:
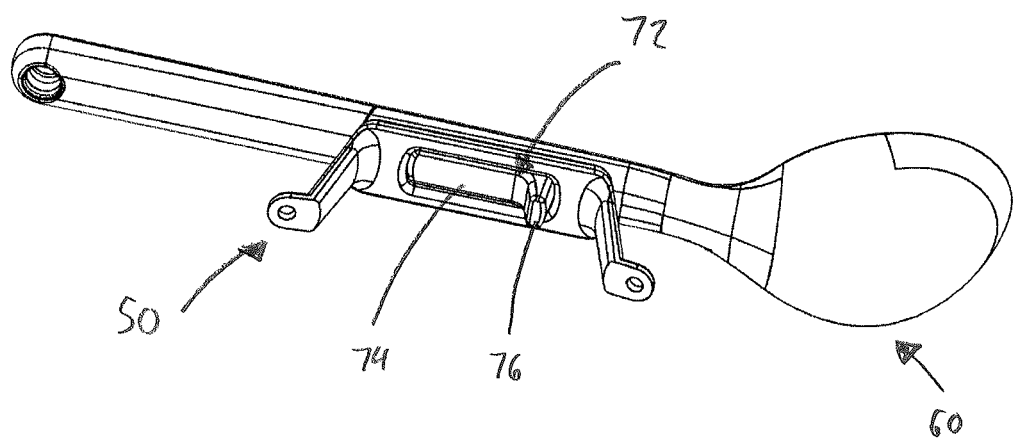
FIG. 4C is a bottom perspective view of the utensil of FIG. 4A and the handle of FIG. 3B.

As further shown in FIGS. 4A-4C, the utensil 60 can include a support 72 disposed on an underside of the upper handle portion 66. The illustrated support 72 includes a base 74 as well as a protrusion foot 76 extending from a portion of the base 74. The base 74 can have a substantially elongate rectangular shape that corresponds to the shape of the handle aperture 56, such that the entire support 72 can be received within the handle aperture 56 during retention of the utensil 60, as depicted in FIG. 4C. The protrusion foot 76 can be positioned adjacent to one end of the base 74 and closer to the head portion 62 of the utensil. While the protrusion foot 76 can have various shapes and sizes, in the illustrated embodiment it has an elongated configuration that tapers inward away from the base 74. It has a flat bottom surface to allow the protrusion foot 76 to rest on a surface, such as a countertop. By positioning the protrusion foot 76 closer to the head portion 62, the weight on each side of the protrusion foot 76 can be balanced to allow the lower handle portion 68 to rest on a surface while the head portion 62 is spaced from the surface.

When the utensil 60 is retained within the handle aperture 56 via the support 72, such as shown in FIG. 4C the lower surface of the upper handle portion 64 contacts and rests on the upper planar surface 56*e* of the handle 50, and the base 74 sits within the handle aperture 56, with the protrusion foot 76 extending through the handle aperture 56. In this way, the utensil can be retained in the handle aperture 56 during a cooking process to aid in cleanliness and allow for a user to rest the utensil 60 when not needed. When the utensil 60 is not retained within the handle aperture 56 and is instead placed upon a surface, the protrusion foot 76 works in conjunction with the end of the lower handle portion 68 to provide anchor points for the utensil 60, as explained above, while simultaneously elevating the head portion 62 at an angle off of the surface. Depending on the shape and size of the head portion 62, such as when different tools are required, the protrusion foot 76 can extend more or less to enable the head portion 62 to remain elevated.

While not shown, the support 72 on the utensil can also be configured to be received within an opening 34*c*, 34*d* formed through the handles 32*a*, 32*b* on the container 200, with the utensil 60 extending in a direction substantially perpendicular to the direction shown in FIGS. 1A and 1B. Such a configuration allows the utensil 60 to rest on the container 20, rather than the lid 40, for example when no lid 40 is used.

Figure 5A:
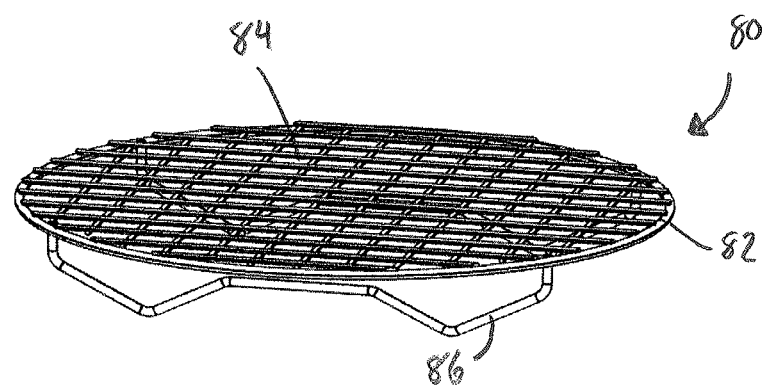
FIG. 5A is front top perspective view of a wire rack for use with the cooking assembly of FIG. 1A.
Figure 5B:
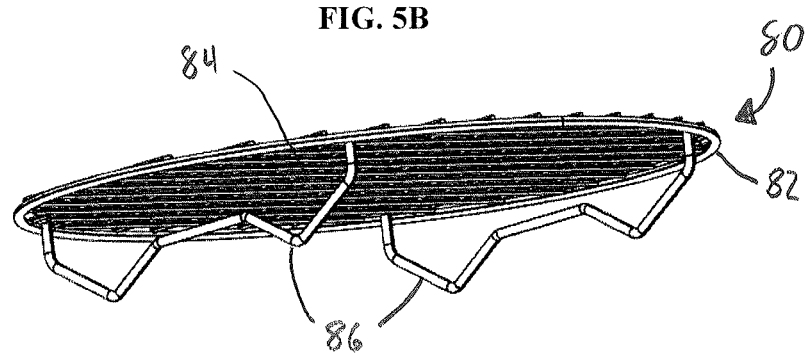
FIG. 5B is a front bottom perspective view of the wire rack of FIG. 5A.

Referring now to FIGS. 5A and 5B, a rack 80 is shown that can be used with the cooking assembly 10. In an exemplary embodiment, the rack 80 has a circular rack frame 82, and a mesh formation of rack wires 84. At a lower portion of the rack frame 82 are two rack supports 86. As shown in FIG. 5B, the rack supports 86 can be made from a single piece of bent wire and can provide two points of contact per side. While the rack 80 is shown with a specific formation, i.e., circular body, rectangular mesh rack wire 84 configuration, and two rack supports 86 providing two points of contact each, the specific formation and structure of the rack 80 can vary. The rack 80 can be used in connection with the cooking assembly 10. Specifically, the rack frame 82 can have a small enough diameter to be received within the cooking chamber 30 and to rest on the bottom surface thereof. The rack 80 can provide an elevated surface upon which a food product can rest, no longer in direct contact with the cooking container base 24. This arrangement may be desirable for various cooking techniques.

Figure 6A:
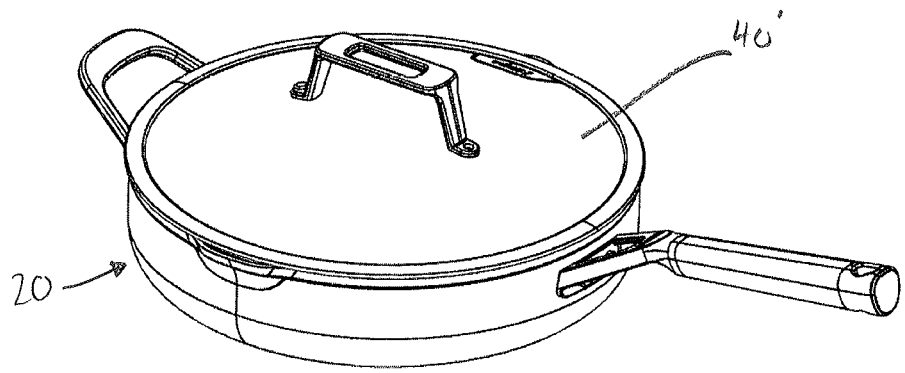
FIG. 6A is front perspective view of another embodiment of a cooking assembly.
Figure 6B:
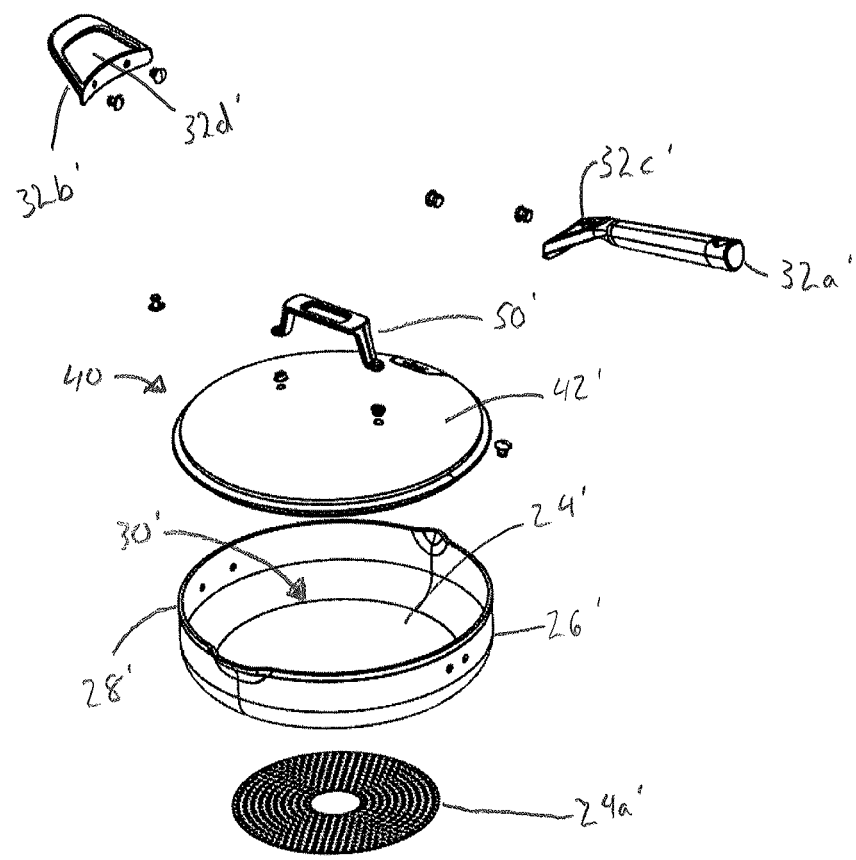
FIG. 6B is an exploded view of the cooking assembly of FIG. 6A.

As indicated above, the container can have a variety of configurations and is not limited to the illustrated pot. FIGS. 6A and 6B illustrated another embodiment of a cooking assembly 10, having a cooking container 12' in the form of a fryer pan, and a cooking lid 14' configured to rest on the cooking container 12'. Like components are not described in detail. The embodiments featured are functional with the cooking assembly 10 depicted in FIGS. 1A-4B, as well as any other embodiments contemplated herein.

The illustrated cooking container 20', similar to container 20, has a container base 24' with a base conductor 24*a'* disposed on an underside of the container base 24'. The container 20' includes a container side 26' extending upward from the base, however in the present embodiment, the container side 26' is shorter than the container side 26. The container side 26' has first and second handles 32*a'* and 32*b'* affixed to opposing exterior sides thereof. Unlike the embodiment above, the handles 32*a'* and 32*b'* are different sizes, where the first handle 32*a'* is longer than the second handle 32*b'*. In particular, the first handle 32*a'* has an elongate cylindrical configuration, whereas the second handle 32*b'* is substantially U-shaped. Both handles have an opening that allows a utensil, such as spoon 60 or a utensil having any other configuration, to rest thereon as previously described with the embodiment of FIGS. 1A-4B.

As further shown, the cooking container 20' defines an interior cooking chamber 30', with an upper extent of the container side 26', namely a container rim 28', defining an opening to the cooking chamber 30'. A cooking lid 40' is shown seated on the cooking container 20' to cover the cooking chamber 30'. The cooking lid 40' includes a lid base 42' and a lid handle 50' centrally disposed on a convex top surface of the lid base 42'. The lid handle 50' has the same configuration as lid handle 50. Accordingly, the lid handle 50' is configured to rest a utensil, such as utensil 60', in the manner previously described. The cooking assembly 10' can also include other features, such as a conductive coating 24*a'* on an outer bottom surface thereof, as previously described with respect to the embodiment of FIGS. 1A-4B.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking assembly, comprising:
   a container defining an inner chamber, the container having an upper rim defining an opening to the inner chamber;
   a lid configured to removably contact the upper rim;
   a lid handle coupled to a central portion of the lid, the lid handle having a horizontally planar upper surface defining an opening therethrough; and
   a utensil having a head portion and a handle portion, the handle portion having a support extending from a lower surface thereof, wherein the utensil is configured to rest on the horizontally planar surface with the support extending into the opening, wherein the support includes a support base having a lower surface thereof and is sized to correspond to and be received within the opening, and a protrusion foot extending downward from the lower surface of the support base, and configured to extend through the opening when the support base is positioned on the lid handle.

2. The cooking assembly of claim 1, wherein the container includes at least one container handle coupled to an outer surface thereof.

3. The cooking assembly of claim 1, wherein the lid handle is substantially U-shaped with first and second legs extending from opposed ends of a middle portion, the horizontally planar upper surface being formed on the middle portion.

4. The cooking assembly of claim 3, wherein the legs diverge relative to one another away from the middle portion.

5. The cooking assembly of claim 1, wherein the utensil has a first terminal end on the handle portion and a second terminal end on the head portion, and the support is closer to the second terminal end.

6. The cooking assembly of claim 1, wherein the opening in the handle is substantially rectangular.

7. The cooking assembly of claim 2, wherein the at least one container handle has an opening formed therethrough and configured to receive the support on the utensil such that the utensil can rest on the at least one container handle.

8. A cooking container assembly, comprising:
   a container defining an inner chamber, the container having an upper rim defining an opening to the inner chamber, and the container having at least one container handle coupled to an outer surface thereof;
   a lid configured to removably contact the upper rim;
   a lid handle coupled to a central portion of the lid, the lid handle being substantially U-shaped with a middle portion having a horizontally planar upper surface and defining an opening therethrough, and first and second legs extending from opposed ends of the middle portion, a terminal end of each of the first and second legs being mated to an upper surface of the lid; and
   a utensil having a handle portion, a head portion, and an axis extending from the handle portion to the head portion along a center of the handle portion, including a support base extending from a lower surface thereof and vertically aligned with the axis, wherein the support base includes a lower surface and is sized to correspond to and be received within the opening, and a protrusion foot vertically aligned with the axis and extending downward from the lower surface of the support base and configured to extend through the opening when the support base is positioned on the lid handle.

9. The cooking container of claim 8, wherein the opening in the lid handle is substantially rectangular.

10. The cooking container of claim 8, wherein the opening in the lid handle has a length that extends along at least 50% of a length of the lid handle.

11. The cooking container of claim 8, wherein the first and second legs diverge relative to one another away from the middle portion.

12. The cooking container of claim 8, wherein a first width of the handle portion is smaller than a second width of the support base.

13. The cooking container of claim 12, wherein a portion of the lower surface of the handle portion rests on the horizontally planar upper surface of the lid handle when the support base is positioned on the lid handle.

14. The cooking container of claim 8, wherein the support base is narrower than the handle portion along the axis.

15. The cooking container of claim 8, wherein the support base is fully encapsulated within the opening of the lid handle when the support base is positioned on the lid handle.

16. The cooking container of claim 8, wherein the support base is horizontally aligned with the opening of the lid handle when the support base is positioned on the lid handle.

17. The cooking container of claim 8, wherein the protrusion foot is positioned on a terminal end of the support base.

18. The cooking container of claim 8, wherein the opening of the lid handle includes an inner surface, and the support base contacts a portion of the inner surface when the support base is positioned on the lid handle.

19. The cooking container of claim 8, wherein the opening of the lid handle is substantially rectangular, and the support base is substantially rectangular.

* * * * *